(12) United States Patent
Scott

(10) Patent No.: US 10,788,584 B2
(45) Date of Patent: Sep. 29, 2020

(54) APPARATUS AND METHOD FOR DETERMINING DEFECTS IN DIELECTRIC MATERIALS AND DETECTING SUBSURFACE OBJECTS

(71) Applicant: Michael Leon Scott, Kensington, MD (US)

(72) Inventor: Michael Leon Scott, Kensington, MD (US)

( * ) Notice: Subject to any disclaimer, the term of this patent is extended or adjusted under 35 U.S.C. 154(b) by 441 days.

(21) Appl. No.: 15/682,990

(22) Filed: Aug. 22, 2017

(65) Prior Publication Data

US 2019/0064362 A1 Feb. 28, 2019

(51) Int. Cl.
| G01S 17/00 | (2020.01) |
| G01S 17/89 | (2020.01) |
| G01S 13/88 | (2006.01) |
| G01S 13/86 | (2006.01) |

(52) U.S. Cl.
CPC ............ *G01S 17/89* (2013.01); *G01S 13/865* (2013.01); *G01S 13/885* (2013.01)

(58) Field of Classification Search
USPC ........................................................ 356/5.01
See application file for complete search history.

(56) References Cited

U.S. PATENT DOCUMENTS

| 8,264,379 | B2 * | 9/2012 | Whitlow | G01S 7/20 340/980 |
| 9,703,002 | B1 * | 7/2017 | Olsson | H01M 2/105 |
| 9,915,729 | B2 * | 3/2018 | Scott | G01S 13/885 |
| 2010/0231418 | A1 * | 9/2010 | Whitlow | G01S 7/411 340/945 |
| 2012/0101747 | A1 * | 4/2012 | Kielkopf | G01M 3/002 702/51 |
| 2014/0196529 | A1 * | 7/2014 | Cronin | E01C 23/01 73/146 |
| 2015/0268050 | A1 * | 9/2015 | Laine | G09B 29/10 701/21 |
| 2016/0117933 | A1 * | 4/2016 | Chan | G08G 5/0069 705/317 |
| 2017/0023671 | A1 * | 1/2017 | Scott | G01S 13/885 |
| 2017/0066530 | A1 * | 3/2017 | Salzmann | B64C 27/04 |

OTHER PUBLICATIONS

Keumsuk Lee, Mark Tomasso, William A. Ambrose, and Renaud Bouroullec, (2007), "Integration of GPR with stratigraphic and lidar data to investigate behind-the-outcrop 3D geometry of a tidal channel reservoir analog, upper Ferron Sandstone, Utah," The Leading Edge 26: 994-998 (Year: 2007).*

* cited by examiner

*Primary Examiner* — James R Hulka
(74) *Attorney, Agent, or Firm* — H. Jay Spiegel

(57) ABSTRACT

An apparatus travels within a 3-dimensional space collecting data that may be used to expose defects in structures and objects beneath the ground surface. In a preferred embodiment, the apparatus includes an unmanned aerial vehicle controlled by a user. The apparatus carries LIDAR and ground penetrating radar and correlates data received from both to facilitate displaying a map with data superimposed on it representing locations of defects in structures and buried objects.

18 Claims, 18 Drawing Sheets

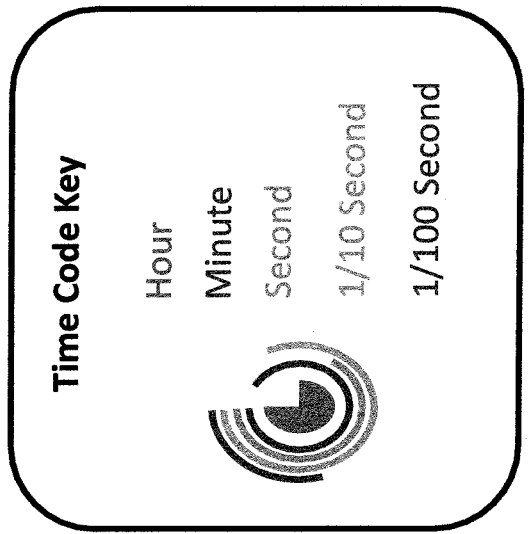
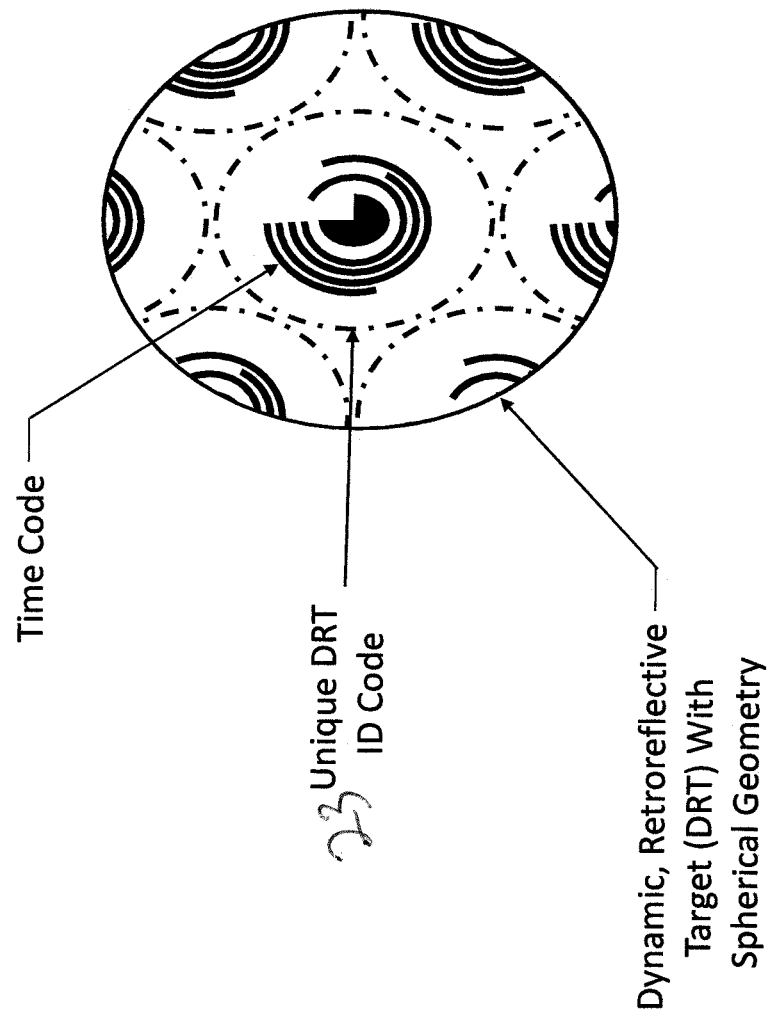
FIG. 5

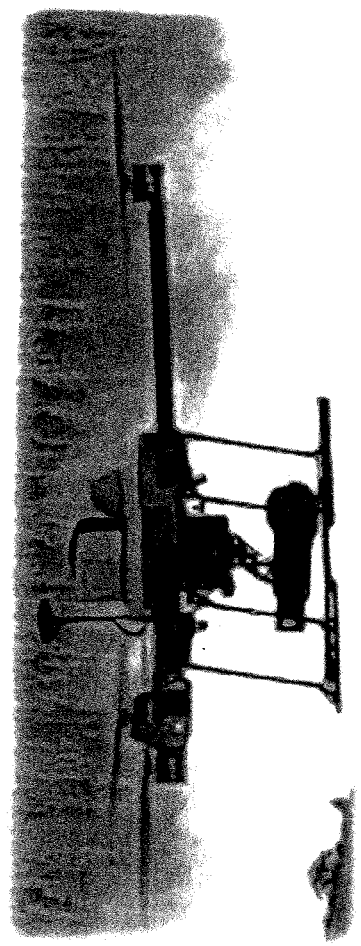
Related to Figure 4 View of Drone Platform Where Differences Include Deployed Landing Gear and a Different Payload
FIG 8
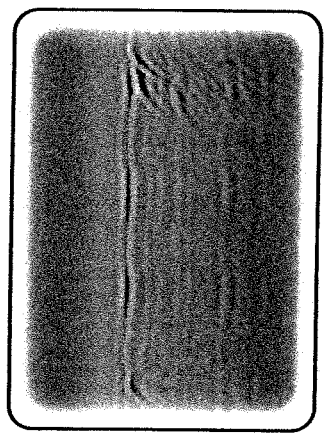
Raw Ground Penetrating Radar (GPR) Data
FIG 7

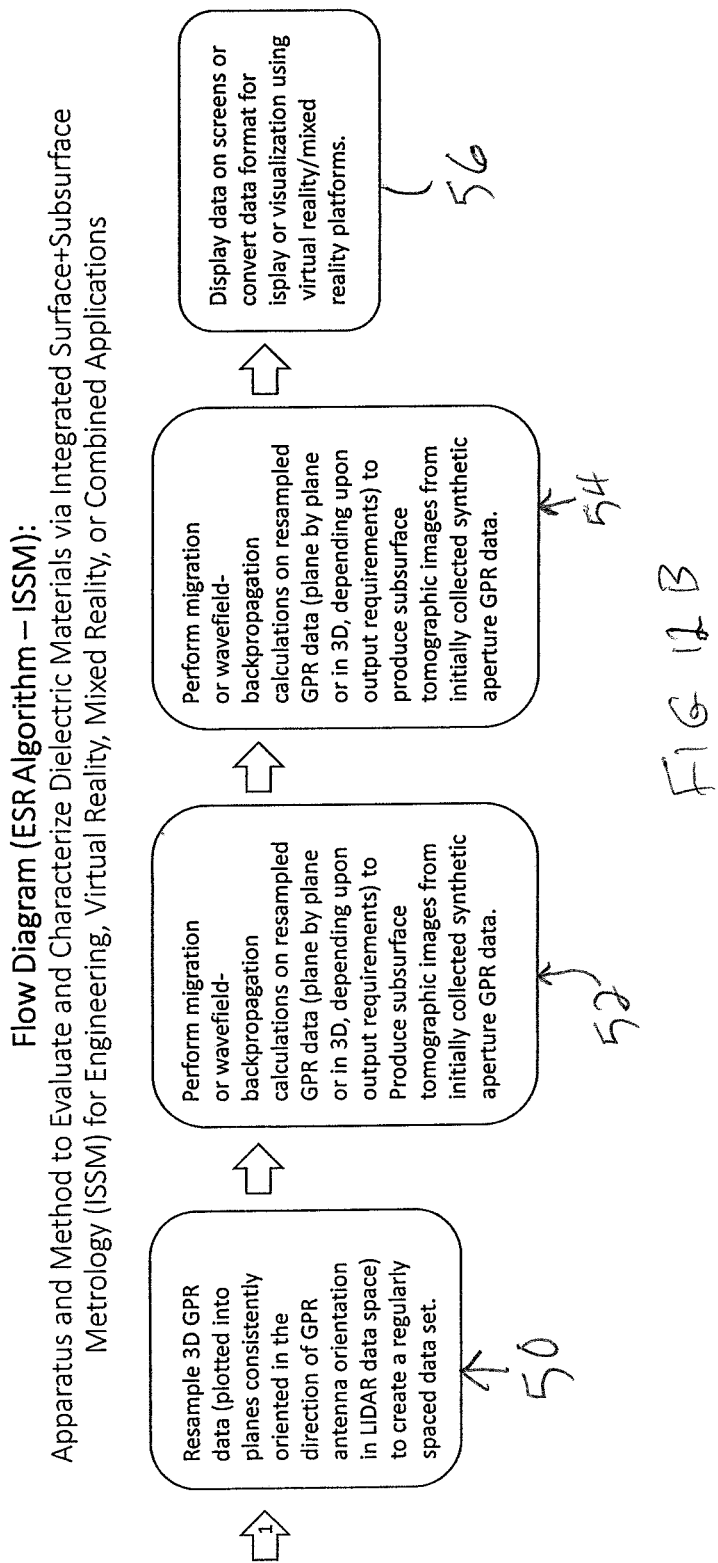

APPARATUS AND METHOD FOR DETERMINING DEFECTS IN DIELECTRIC MATERIALS AND DETECTING SUBSURFACE OBJECTS

BACKGROUND OF THE INVENTION

The present invention relates to an apparatus and method for determining defects in dielectric materials and detecting subsurface objects materials. Construction BIM, as-built geometry measurement, material condition evaluation, and subsurface utility location are each frequently difficult to address prior to or during construction. Previously, many separate processes and manual resources were required to perform surface+subsurface metrology, including complex, inadequate and error prone subsurface engineering surveys, manual documentation, hand digging, material vacuuming, and many more repetitive processes and procedures.

Over the course of decades, nondestructive sensing techniques have slowly evolved to facilitate inspection of structures, buildings, travel ways, bridges, subsurface utilities, plus detection and evaluation of buried threats and more. Among those techniques, most pertinent to the teachings of the present invention are Ground Penetrating Radar (GPR) (Annan, 2002; Daniels, 2004; Soldovieri, 2009) and Light Detection And Ranging (LIDAR) (McManamon, 2015).

While Ground Penetrating Radar (GPR) can be an effective tool to perform non-invasive inspections, major issues with current techniques include time-consuming, complex and error-prone data collection, terrestrial measurement constraints, and application specific analysis only reliably performed by specialists. To date, an effective technology to consistently address these challenges has been elusive. No prior GPR technique provides efficient, integrated surface+ subsurface inspections from a compact, airborne Unmanned Aerial System (UAS) or compact terrestrial platform. For example, where construction site GPR and LIDAR are performed, data is generally collected on site using two separate and distinct terrestrial measurement systems. Data is subsequently post-processed and mapped separately onto construction drawings for diverse applications. Separate GPR and LIDAR results can also be laboriously processed on site and manually mapped onto site surfaces as paint markings indicating the presence of subsurface features below, but this is presently difficult and time consuming. Prior to IS SM, combining GPR and LIDAR required redundant procedures and analysis constrained to terrestrial data collection (limiting automation potential). Combined results are often difficult to analyze unless an expert is available.

Applicant is aware of the following prior art:

U.S. Published Patent Application No. 2003/0135328 A1 to Burns et al. teaches a method for merging position information with measurements and filtering to obtain high-quality images that are positioned accurately with respect to global coordinates. Burns et al. fail to teach a device that provides integrated positioning information in GPS denied or GPS challenged environments and/or with irregular data sampling due to position under-sampling and interpolation requirements. Burns et al. also fail to teach a device free from the need for complex mechanical wheel encoders that are inherently terrestrial and must maintain constant contact with the ground to function. Finally, Burns et al. fail to teach a device intended for virtual reality or mixed reality applications and end users, including the lack of integrated surface and subsurface information.

U.S. Pat. No. 6,064,940 to Rodgers et al. teaches a plotter for construction sites and method. Rodgers et al. fail to teach a device that provides subsurface sensing information to the end user. Rodgers et al. fail to teach a device that provides virtual reality or mixed reality information to the end user on a display device. Rodgers et al. fail to teach a device that provides global site information within the field of view of the display device. Rodgers et al. fail to teach a three-dimensional representation of site information, as said information is projected and painted onto two-dimensional site surfaces.

U.S. Pat. No. 6,094,625 to Ralston teaches augmented vision for survey work and machine control. Ralston fails to teach display of subsurface objects on a virtual reality or mixed reality display. Ralston fails to teach real time positioning within accuracy required for engineering applications.

U.S. Published Patent Application No. 2014/0002292 A1 to Knierim teaches almost real-time sampling for practical ground-penetrating radar impulse data collection. Knierim fails to teach practical GPR data collection capabilities due to data sampling issues, including Equivalent Time (ET) measurement time delay requirements to achieve useful signal to noise ratios. Knierim also fails to teach capabilities to make results compatible with augmented reality or mixed reality display of subsurface measurements. Knierim fails to teach positioning measurement results within accuracy required for engineering applications.

U.S. Pat. No. 9,218,529 to Lewis et al. teaches 3-D imaging sensor based location estimation. Lewis et al. fail to teach location and orientation determination within engineering accuracy. Lewis et al. fail to teach subsurface GPR data collection for subsurface imaging and correlation with surface data. Lewis et al. fail to teach compatibility with augmented reality and mixed reality display of subsurface results.

U.S. Pat. No. 8,587,583 to Newcombe teaches three-dimensional environmental reconstruction. Newcombe fails to teach GPR subsurface imaging to correlate with surface data. Newcombe fails to teach efficient LIDAR sensing to map surface features and determine the position and orientation of the sensor apparatus. Newcombe fails to teach augmented reality and mixed reality display of subsurface results. Newcombe fails to teach methods to provide engineering accurate position and orientation information.

U.S. Pat. No. 9,201,499 to Chang et al. teaches object tracking in a three-dimensional environment. Chang et al. fail to teach 3D LIDAR range imaging in three dimensions, as 3D LIDAR range image data are not collected (only conventional 2D images are collected). Also, survey accurate positioning is not enabled. In addition, Chang et al. fail to teach correlation of surface information with subsurface information, as no GPR data is made available or utilized.

U.S. Pat. No. 8,751,301 to Chau teaches banner advertising in spherical panoramas. Chau fails to teach 3D LIDAR range imaging, as LIDAR range image data are not collected (only conventional 2D images are collected). Chau also fails to teach correlation of surface information with subsurface information, as no subsurface data (such as GPR data) is made available or utilized.

U.S. patent application Ser. No. 14/331,218 to Abovitz et al. teaches a planar waveguide apparatus with diffraction element(s) and system employing same. Abovitz et al. fail to teach 3D LIDAR range imaging, as LIDAR range image data are not collected. Abovitz et al. fail to reliably provide surface or subsurface information with engineering accuracy (corresponding to engineering accuracy of the position and orientation of the data collection apparatus). Abovitz et al. also fail to teach correlation of surface information with subsurface information, as no GPR data is made available or utilized.

U.S. Pat. No. 6,249,271 to Albert et al. teaches retroreflective electrophoretic displays and materials for making the same. Albert et al. fail to teach application of retroreflective electrophoretic displays and materials applications as a means to develop three-dimensional, dynamic targets for LIDAR and other imaging devices to detect and locate. Further, Albert et al. fail to teach application of electrophoretic displays and materials applications as a means to symbolically display device time (down to hundredths of a second or better) for the purpose of synchronizing data collected by multiple devices.

Prior art by John Anderson (US Army Corps of Engineers Engineer and Development Center (ERDC). LIDAR-activated phosphors and Infrared Retro-reflectors: Emerging Target Materials for Calibration and Control (J. Anderson et al., August 2010, Photogrammetric Engineering and Remote Sensing). Anderson et al. fail to teach dynamic retroreflective display technology to synchronize timing between sensing devices using a dynamic, retroreflective clock image (utilizing retroreflective and electrophoretic display mapped onto a target).

SUMMARY OF THE INVENTION

The present invention relates to an apparatus and method for determining defects in dielectric materials and detecting subsurface objects. The present invention includes the following objects, aspects, and features:

(1) The invention apparatus and method includes ADOJAM Dynamic, Retroreflective Targets (DRTs), which can be used to synchronize LIDAR and/or video instrument results with results from additional device(s) or test equipment positioned within the ISSM's LIDAR and/or video instrument field of view. ADOJAM Dynamic, Retroreflective Targets (DRTs) provide a further means to efficiently integrate diverse data types (including conventional test or construction data) into ISSM. The invention apparatus and method can provide virtual reality information, may augment existing mixed reality engineering results, or it can provide information off site (for purposes including construction planning and coordination, as built Quality Control/Quality Assurance, and more).

(2) Relevant ISSM based construction, engineering, defense and software applications can facilitate construction planning and coordination, Building Information Modeling (BIM), as built Quality Control/Quality Assurance (QC/QA), military situational awareness and more. The subject system will address diverse needs such as: materials evaluation throughout the infrastructure asset life cycle plus construction phase (BIM), inspection at service inception (QC/QA), maintenance inspection to promote State of Good Repair (SOGR) initiatives, buried threat detection to meet military requirements including detection of nonmetals, such as plastic land mines and Improvised Explosive Devices (IEDs), geometry and/or material characterization to evaluate engineering standards compliance, and more.

(3) Results will include improvements to construction processes and deliverables plus informed maintenance, rehabilitation, replacement, or decommissioning decisions that save time and money. The invention will also support detection and evaluation of military buried threats. These buried threats will be detected from a standoff distance without the need for terrestrial sensors, terrestrial vehicles, or expensive, high altitude drone technology.

(4) The ISSM system can (a) periodically monitor and document construction sites at successive construction stages (for BIM applications), (b) collect quality control/quality assurance information (upon construction completion), (c) evaluate the condition of aging infrastructure, (d) detect and evaluate buried threats, plus many other surface and/or subsurface measurement and evaluation scenarios. ISSM will also make results straightforward to process, interpret and use.

(5) Efficient, cost effective ISSM surface+subsurface measurements will accurately and efficiently map buried utilities, deterioration phenomena and more, while state of the art technologies require cost prohibitive equipment and experts in the field. ISSM will also measure surface+subsurface phenomena for military applications in the field.

(6) ISSM meets needs to synchronize surface and subsurface measurements via an efficient process (including data fusion algorithms and DRT synchronization of test results, where applicable), enabling streamlined engineering work plus virtual reality/mixed reality visualization in the field. Data fusion algorithms can integrate GPR and LIDAR location/pose via complementary onboard sensor results to provide accurate, periodic, location synchronized data. Optionally, Secondary ISSM sensors or the ISSM itself can be equipped with DRTs to time synchronize measurement results between two otherwise unconnected devices.

(7) A Primary ISSM device is mandatory for any ISSM application (as it provides Primary location information for the Primary ISSM), while one or more Secondary ISSMs may be added when sensors are deployed at one or more Secondary location(s), (different from the Primary ISSM location). After post-processing of results, this innovation provides engineers, technicians and construction workers with a convenient interface to use important subsurface information for on-site information gathering, off site planning, and on-site decision making.

(8) For military applications, ISSM buried threat detection and evaluation provides an unprecedented combination of surface and subsurface information derived by analyzing and integrating measurements from a compact, hover capable, airborne system.

(9) Unique ISSM technology advances and integrates GPR and LIDAR in a system to provide seamless surface and subsurface inspection of structures, roadways, bridges, buried utilities, military sites, combat theaters of operation and more. Subsurface mixed reality information can also be implemented when GPR and LIDAR are synchronized with ADOJAM's proprietary procedures and algorithms. The result is accurate location and orientation of the measurement apparatus together with associated measurements of surface and subsurface features within engineering tolerances.

(10) In addition, DRT enabled ISSM data collection provides a convenient means to augment ISSM results by integrating diverse, conventional data and results into ISSM results. DRT enabled devices synchronize conventional data and results with ISSM data and results (providing collocation of diverse data sources). DRT enabled ISSM can also be used for ISSM data collection where a Primary ISSM device is present and any number of Secondary ISSM devices are in the field of view of the Primary ISSM device.

(11) IS SM eliminates many steps and requirements by performing measurements from a single, integrated, airborne capable platform. ISSM can also provide rapid data collection, streamlined analysis, and relevant results for easy interpretation by experts or laypeople alike. Novel ISSM technology will enhance efficiency, reduce data collection and analysis costs, diversify GPR and LIDAR applications, broaden the technologies' user base, and create new opportunities to save money and improve engineering decision making.

(12) Many building and construction site applications can benefit from efficient information gathering using ISSM GPR and LIDAR data collection with analysis, including systematic airborne ISSM data collection capabilities and integrated analysis. For example, accurately locating buried utilities (including safe areas to dig around them) is a critical need that must be addressed by engineers, planners, and construction workers on a regular basis. In addition, construction material characterization such as homogeneous layer thickness measurement, concrete cover depth measurement, and subsurface void, defect and crack detection are presently performed using suboptimal techniques (including coring or costly nondestructive evaluation currently practiced). ISSM will collect and analyze GPR and LIDAR data together, enabling visualization using virtual reality or mixed reality display technology. In addition, DRT further enables ISSM data collection by providing a convenient means to integrate diverse, conventional data and results into ISSM results via an efficient procedure. ISSM data and results can be stored and processed further for subsequent virtual reality or mixed reality visualization by other users. The present invention enables these applications.

As such, it is a first object of the present invention to provide an apparatus and method for determining defects in dielectric materials and detecting subsurface objects.

It is a further object of the present invention to provide such an apparatus and method in which a frame is provided on which are mounted a light detection and ranging (LIDAR) device and a ground penetrating radar (GPR) device.

It is a still further object of the present invention to provide such an apparatus and method in which a computer is provided to receive signals from the LIDAR and GPR and correlate them together to facilitate accurate mapping of a three-dimensional space and adjacent area.

It is a yet further object of the present invention to provide such an apparatus and method in which the adjacent area may comprise an open space, a solid structure or an underground area.

It is a still further object of the present invention to provide such an apparatus and method in which in a preferred embodiment thereof the frame is mounted on an unmanned aerial vehicle (UAV) which may be controllably moved within a three-dimensional space.

It is a yet further object of the present invention to provide such an apparatus and method in which in another embodiment, the frame is contained within a backpack or carried by a person.

It is a still further object of the present invention to provide such an apparatus and method in which a UAV carries a camera transmitting images to a monitor carried by a user so that the user may be continually aware of the location of the UAV within a three-dimensional space.

It is a still further object of the present invention to provide such an apparatus and method in which a display is provided to display a map with data derived from operation of the GPR so that a user can determine locations of defects in structures and locations of underground objects.

These and other objects, aspects, and features of the present invention will be better understood from the following detailed description of the preferred embodiments of the present invention when read in conjunction with the appended drawing figures.

BRIEF DESCRIPTION OF THE DRAWINGS

FIG. 5 shows a top view of a dynamic Retroreflective Target (DRT) with spherical geometry.

FIG. 7 shows an image of an example of raw data resulting from use of ground penetrating radar.

FIG. 8 shows an image using ground penetrating radar of imperfections found in reinforcing steel.

FIGS. 12A and 12B show a flow diagram for the enhanced subsurface reality algorithm for use in the present invention.

SPECIFIC DESCRIPTION OF THE PREFERRED EMBODIMENTS

Figure 1:
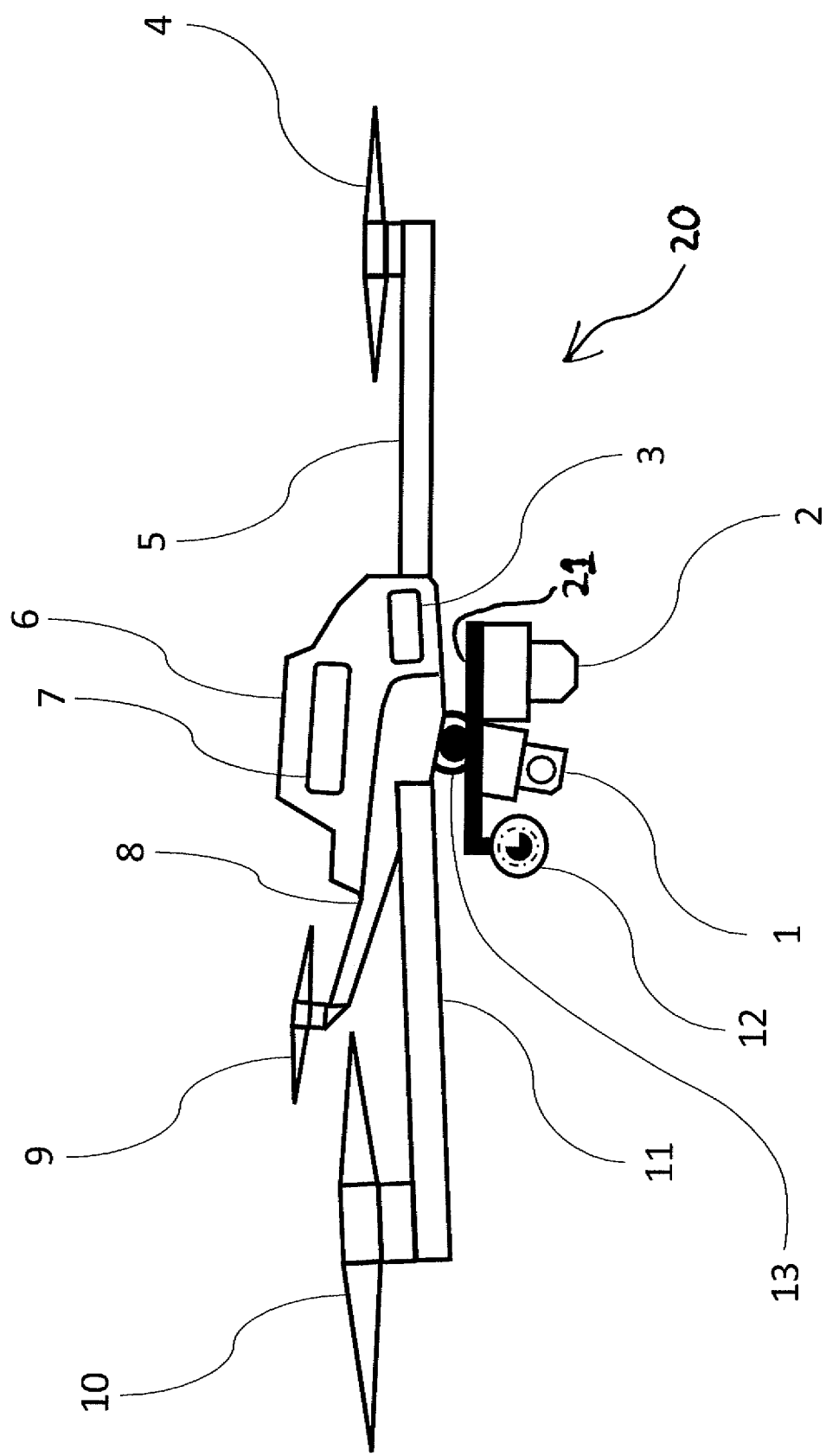
FIG. 1 shows an oblique perspective view of the prototype inventive device.
Figure 2:
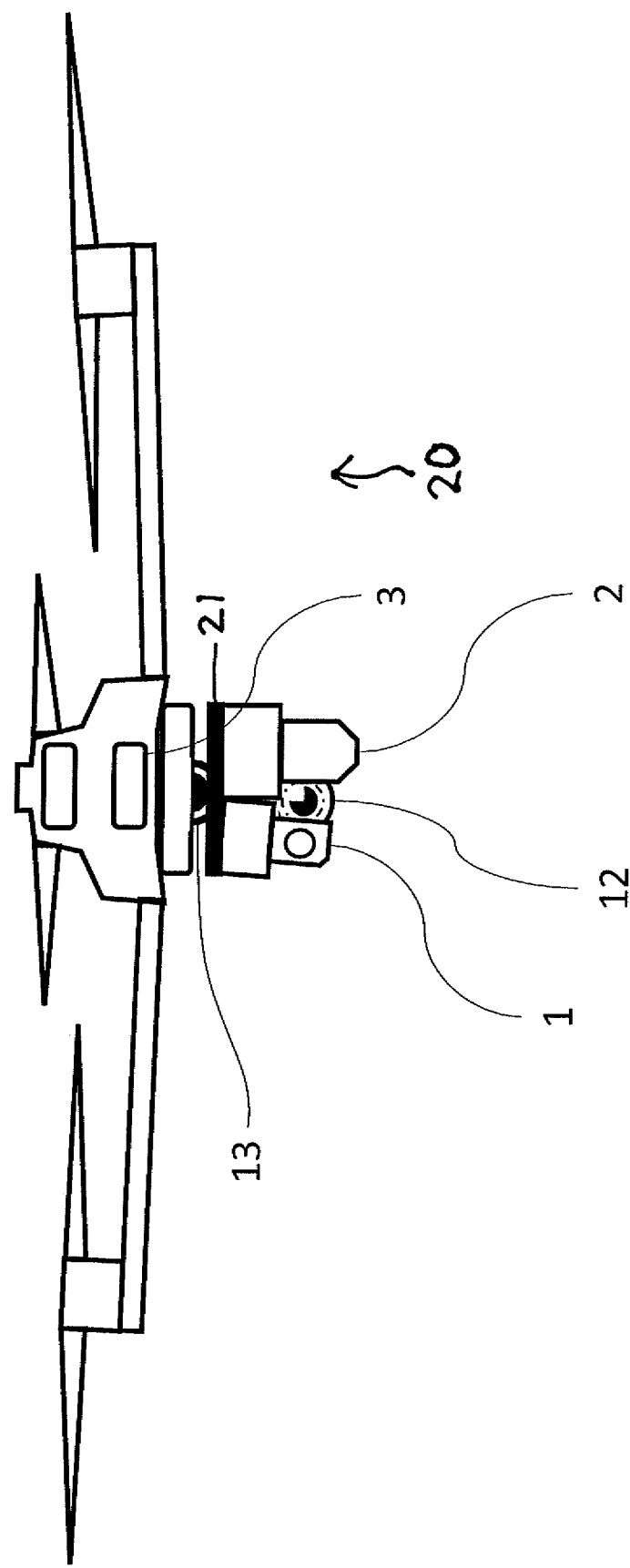
FIG. 2 shows a front view of the prototype inventive device.
Figure 3:
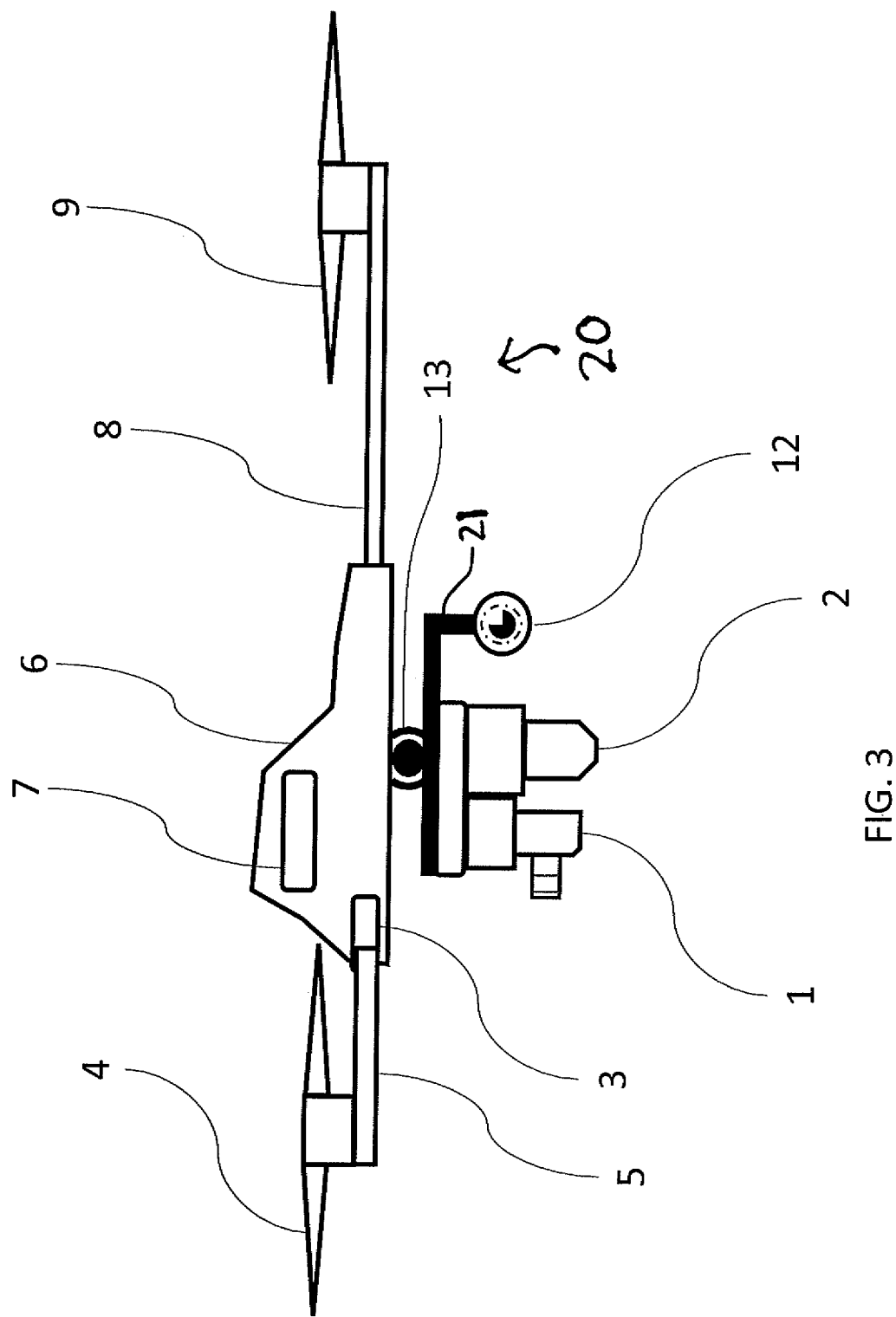
FIG. 3 shows a side view of the prototype inventive device.

With reference first to FIGS. 1-3, a principal embodiment of the present invention utilizes an unmanned aerial vehicle (UAV) generally designated by the reference numeral 20. The UAV 20 includes struts 5, 8 and 11, propellers 4, 9 and 10, and a housing 6 supports the struts, propellers, and other components of the UAV 20.

Mounted on the housing 6 is a contact with light detection and ranging (LIDAR) device 1, a compact ground penetrating radar (GPR) device 2, an electro-optical camera 3, and a compact battery powered computer 7.

Also mounted on the UAV is an inventive Dynamic Retroreflective Target (DRT) 12. The LIDAR, GPR and DRT are mounted on a frame 21 with an instrument gimbal 13 which allows the instruments to remain fixed on their targets regardless of the spatial orientation of the UAV 20.

Figure 4:
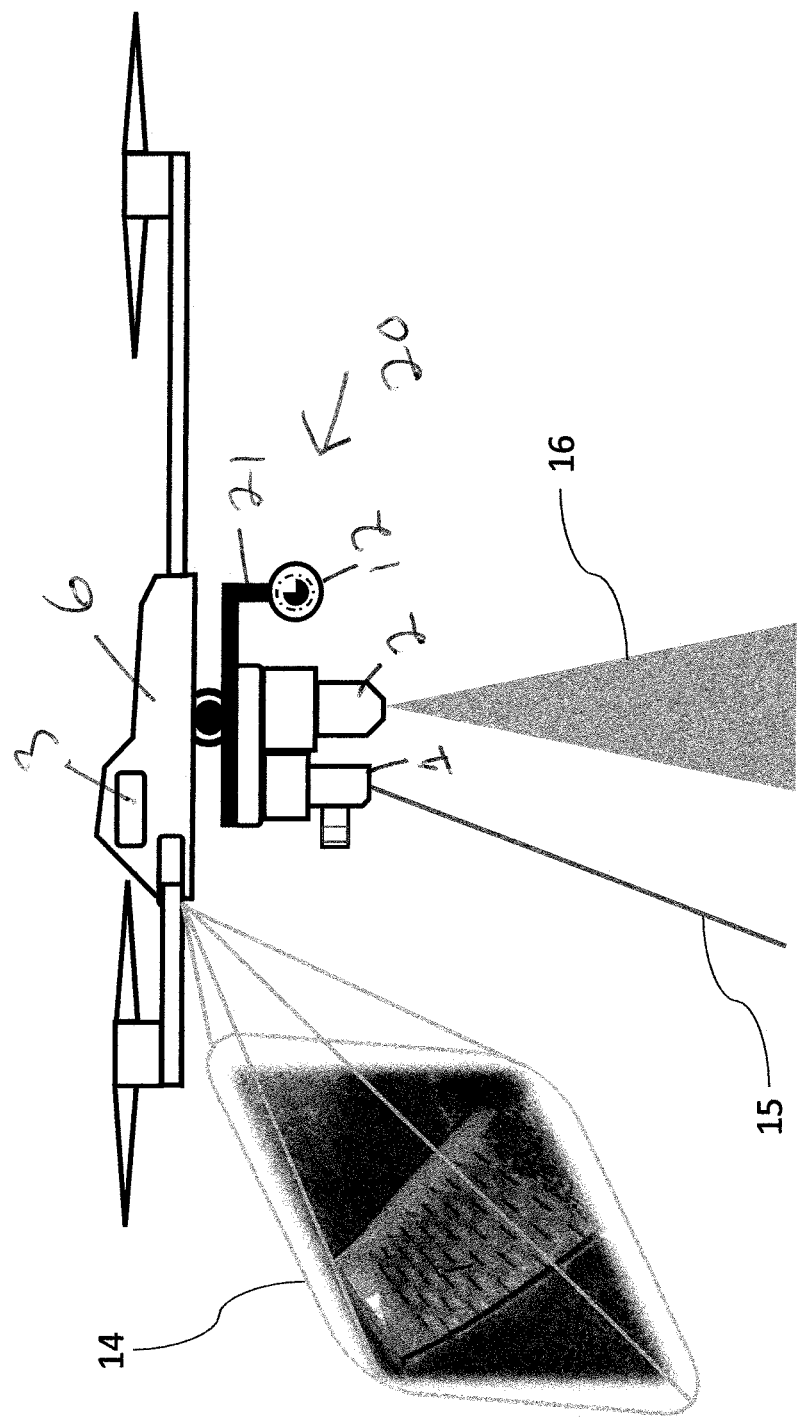
FIG. 4 shows example data collection using the inventive ISSM device, evaluating surface+subsurface material features via an integrated analysis procedure.

With reference to FIG. 4, the GPR emits a beam 16 which bounces off an object and comes back to the UAV 20 to be analyzed by the compact computer 7. LIDAR 1 emits a laser beam 15 which is also reflected back to the UAV 20 so that the position and orientation of the UAV 20 can be determined and maintained. The reference numeral 14 is a schematic representation of an electro-optical image which is created by analysis of the data received from operation of the LIDAR and GPR.

With reference to FIG. 5, a top view of the DRT 12 is shown. The DRT displays a dynamic, graphical code 23 to indicate device time (as measured down to the hundredth of a second or less). DRTs 12 are attached to and associated with Secondary ISSM devices or processes. DRTs 12 are used to synchronize Secondary ISSM devices or processes with Primary ISSM devices or processes. Each DRT 12 displays a unique identifying code (to distinguish it from any other DRT). DRT time and identification codes are detectable on all sides of the sphere shape they are displayed on. The DRT display dynamically displays changing time using a flexible electrophoretic display technology (such as "E-ink") that conforms to the sphere-shaped target core.

Figure 6:
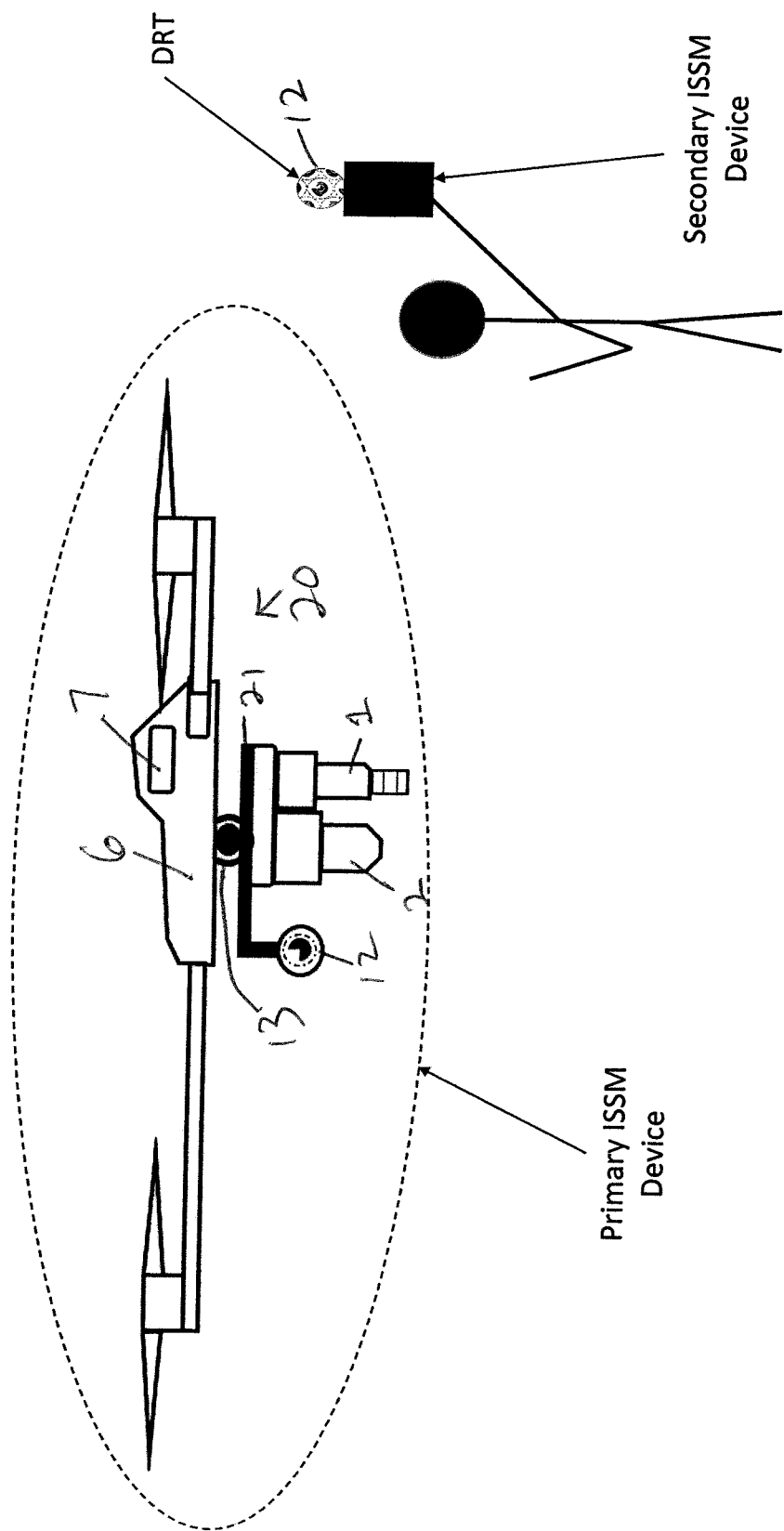
FIG. 6 shows a schematic representation of how the present invention can be used to collect data via a secondary integrated surface and subsurface metrology process or device.

FIG. 6 illustrates how an example DRT 12 of the present invention can be used to collect data via a Secondary ISSM device or process, which can be synchronized with a Primary ISSM device or process during data post-processing. When Secondary ISSM data is recorded locally with its corresponding collection time, DRT synchronization allows Primary ISSM and Secondary ISSM data to be integrated via data post-processing (as if all Primary and Secondary ISSM data was collected by a single system). As shown, the Secondary ISSM device includes a DRT 12 that receives the beams of the LIDAR that reflects them back to the UAV 20 where data can be analyzed by the computer 7 which has a receiver to receive reflected signals.

FIGS. 7 and 8 show examples of images produced by the GPR operated from a UAV. FIG. 7 shows raw GPR data which illustrates Synthetic Aperture Radar (SAR) responses to concrete in profile depth view. FIG. 8 shows multi-static antenna array data (post-processed using a migration algorithm) for reinforcing steel that includes corrosion induced delamination areas on a bridge deck. Results for concrete bridge decks, concrete dams, or highways alert the owner of facility condition, including deterioration information relevant to repair, rehabilitation, or replacement decisions.

Figure 9:
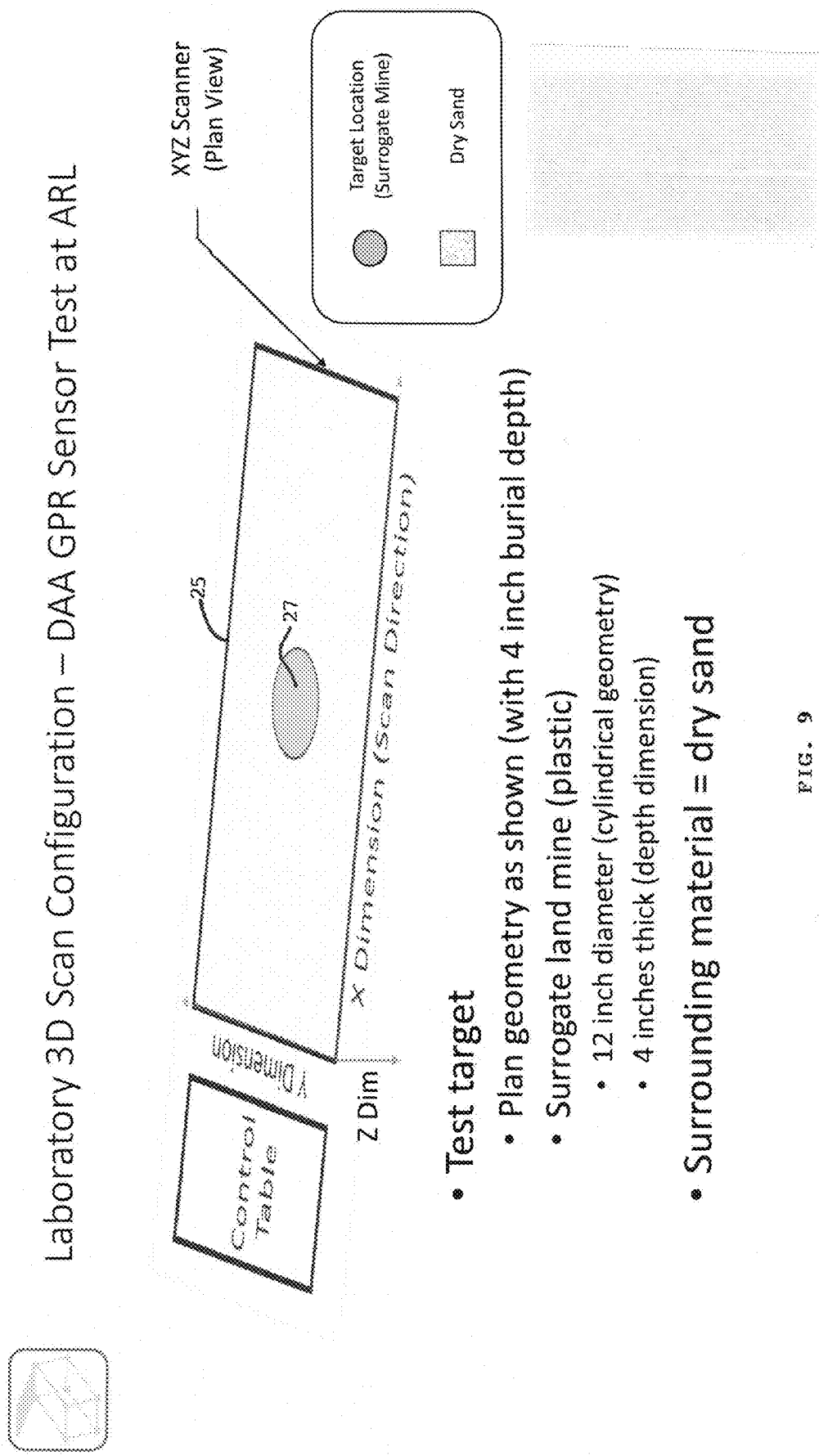
FIG. 9 shows a schematic representation of scanning using the present invention to locate a subsurface explosive mine.
Figure 10:
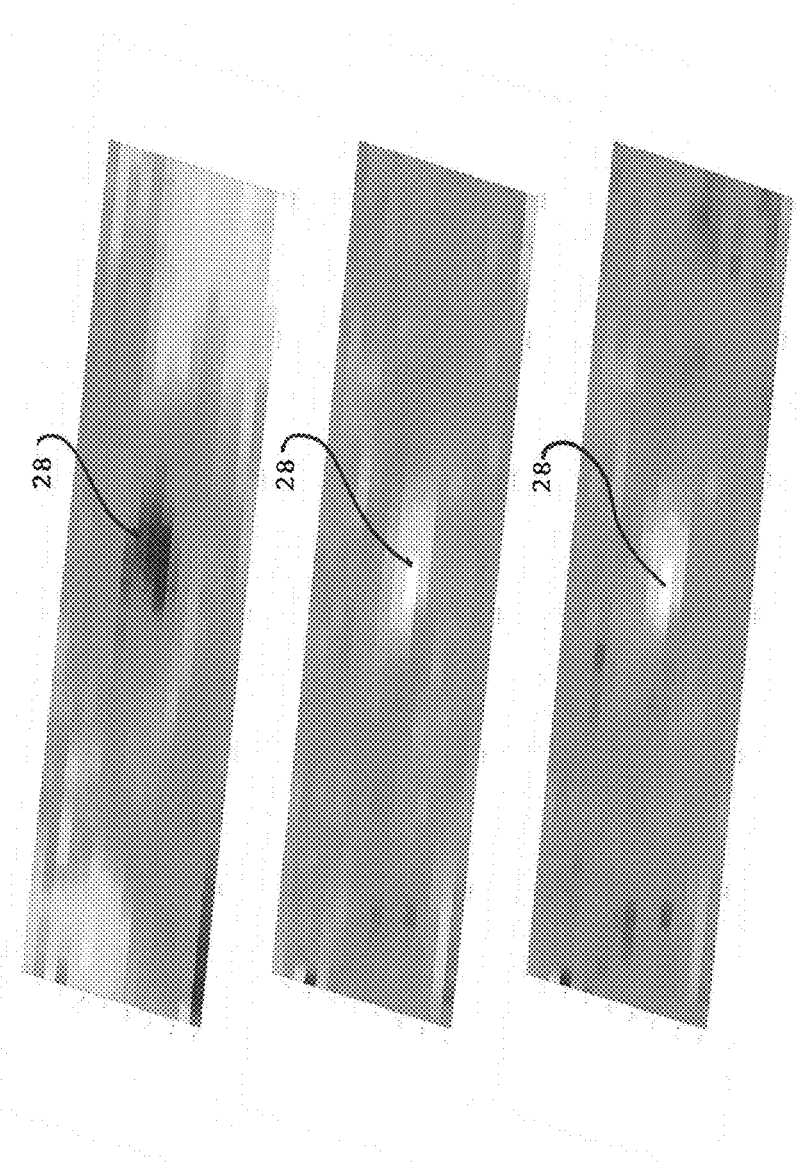
FIG. 10 shows the results of scanning as shown in FIG. 9 depicting images resulting from examining below the surface a distance of 4 inches.
Figure 11:
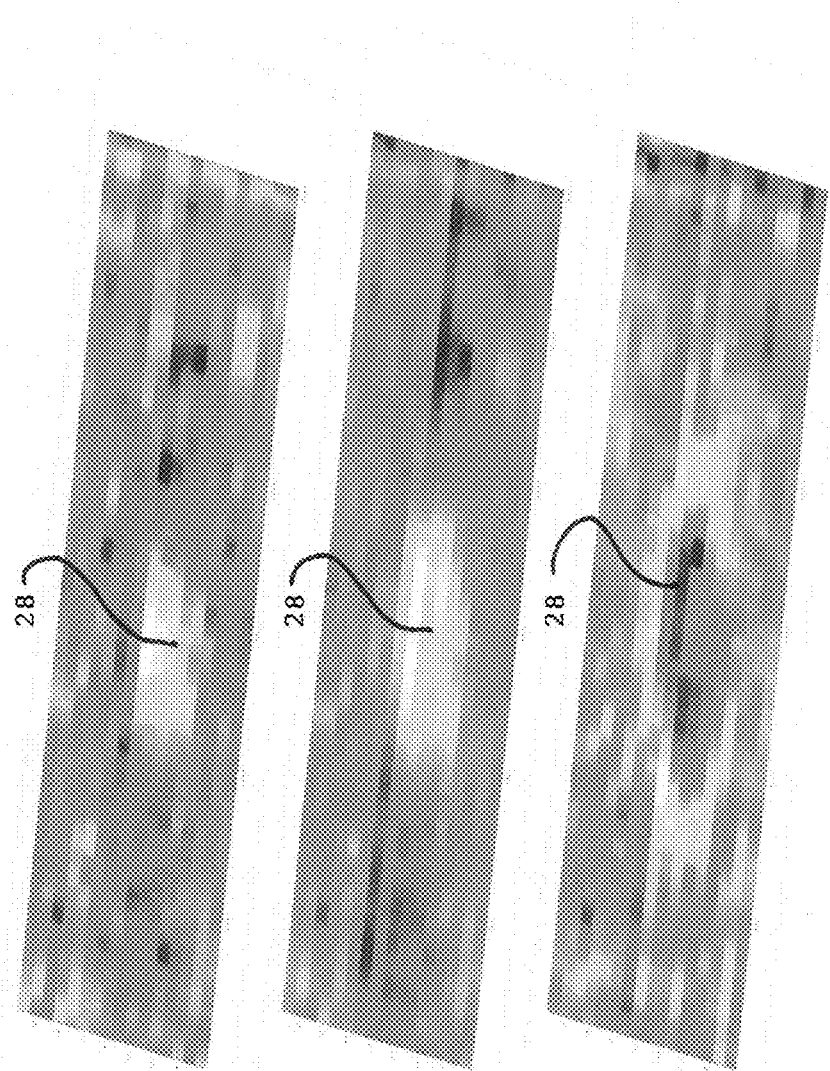
FIG. 11 shows the results of scanning as shown in FIG. 9 depicting images resulting from examining below the surface a distance of 8 inches.

With reference to FIG. 9, a schematic representation shows an area of land 25 in which a land mine 27 is buried. A scan is accomplished through the X direction at a width corresponding to the Y dimension and at a depth corresponding to the Z dimension. As best seen in FIG. 10, at a depth of 4 inches in the Z dimension, an anomaly 28 is detected shown in the middle of the X-Y grid. FIG. 11 shows a similar scan going down 8 inches in the Z dimension direction showing the anomaly in larger form. This demonstrates that the present invention may be used in military applications to detect land mines or Improvised Explosive Devices (IEDs) whether made of metal, plastic, or other materials.

Figure 12A:
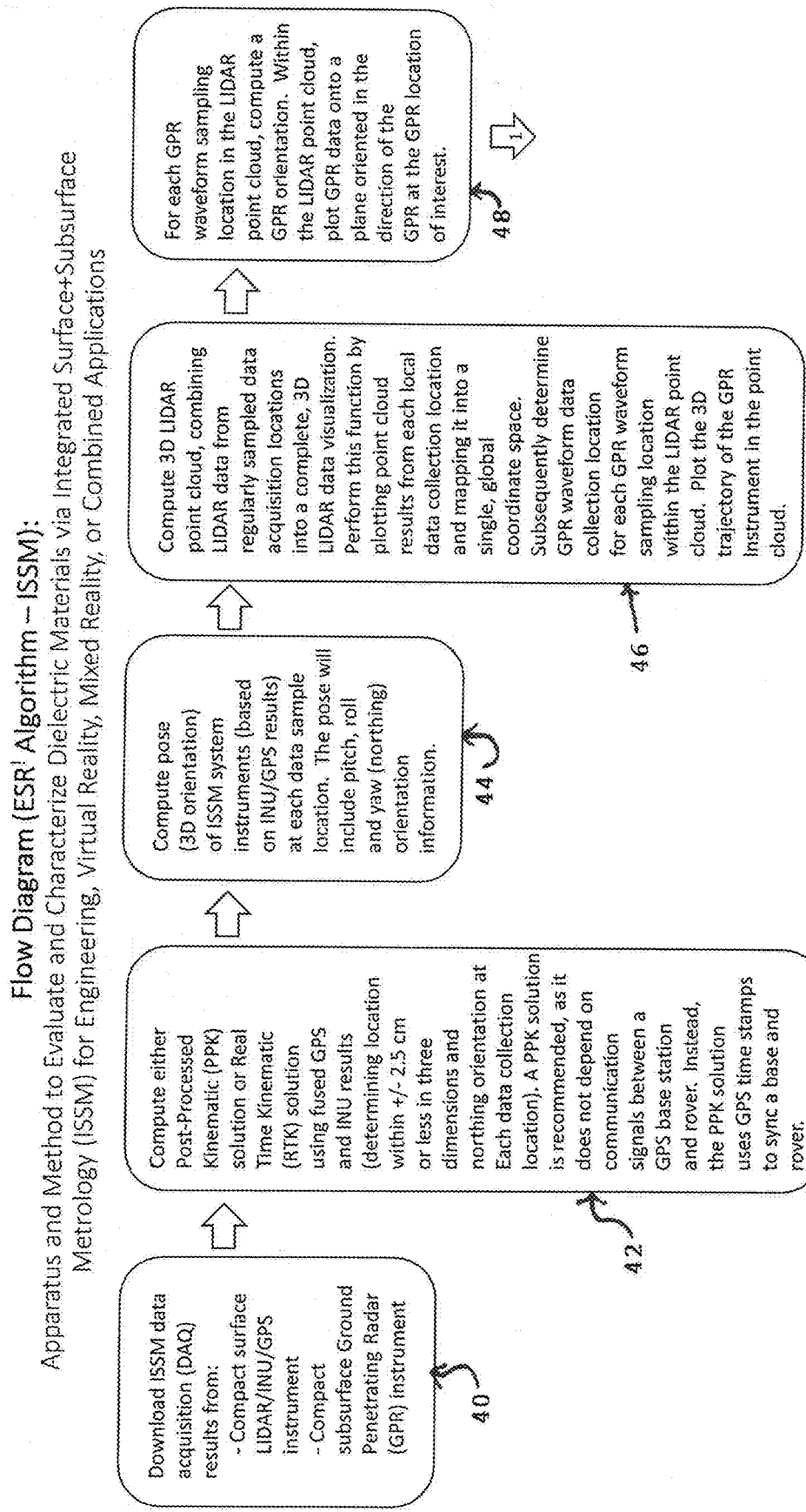

Reference is now made to FIGS. 12A and 12B. These figures combine together to show a flow diagram of the enhanced subsurface reality (ESR) algorithm of the invention surface and subsurface metrology (ISSM) system. As shown in FIG. 12A, ISSM data acquisition is downloaded resulting from operation of the LIDAR and GPR instruments (box 40). Box 42 explains how computations are undertaken, either post-processed kinematic (PPK) solutions or real time kinematic (RTK) solutions using fused GPS and INU results. Box 44 explains how 3-D orientation poses are undertaken including pitch, roll, and yaw to maintain the system stable and accommodate to any orientation changes. Box 46 explains how computations of 3-D LIDAR data are undertaken to maintain position and orientation and to accommodate to changes in those factors. Box 48 explains for each GPR waveform sampling location in the LIDAR point cloud, GPR orientation is also computed.

With reference to FIG. 12B, box 50 explains resampling of GPR data, box 52 explains that migration or wave field back propagation calculations are performed on the resampled GPR data. Box 54 explains that the calculations of GPR data box 52 are performed to produce subsurface tomographic images. Box 56 explains that those subsurface tomographic images are then displayed for saving and visualization.

Figure 13:
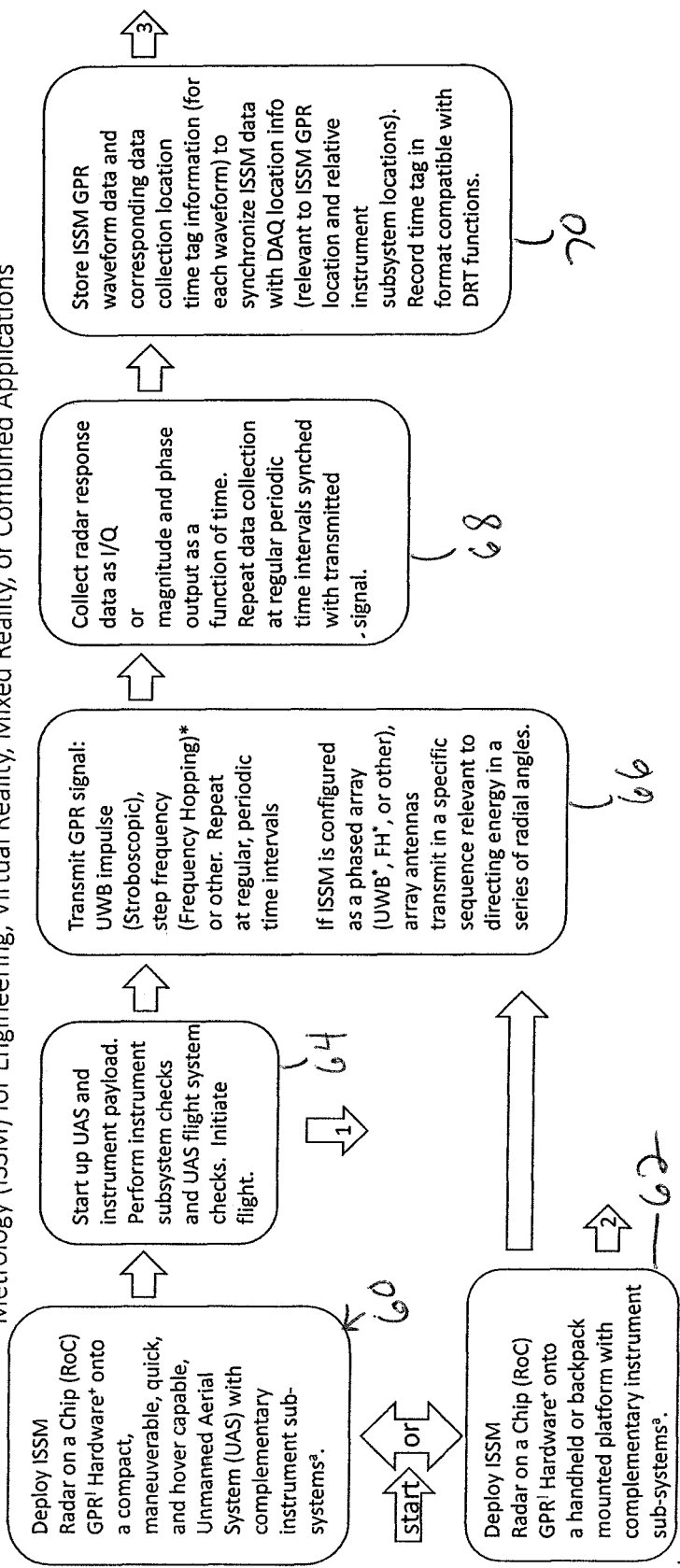
FIG. 13 shows a flow diagram for the operation of data collection for the primary integrated surface and subsurface metrology of the present invention.

With reference to FIG. 13, the sequence of events is explained in flow diagram form concerning data collection for the Primary ISSM GPR. Box 60 explains how the GPR 2 is deployed on a UAV 20. Box 62 explains that, alternatively, the GPR can be deployed on a handheld platform or backpack mounted platform (not shown) which in each case, the UAV, handheld or backpack, the GPR is movable over an area to retrieve data that may be used to perform calculations and display imperfections in a surface including below the surface.

Box 64 runs starting up the UAV and initiating flight. Box 66 explains how the GPR signal is transmitted and repeated at regular periodic time intervals. Applicant notes that while this is taking place, the INU/GPS or INU/LIDAR Simultaneous Localization and Mapping (SLAM) are frequently re-calculating position and orientation to ensure that data collected can accurately be referenced to the surface area where measurements are being taken. Box 68 discusses collection of ground penetrating radar response data and repeating data collection at regular periodic time intervals. In Box 70, it is explained that the waveform data from the GPR operation and corresponding time tag information and location information are recorded and stored.

Figure 14:
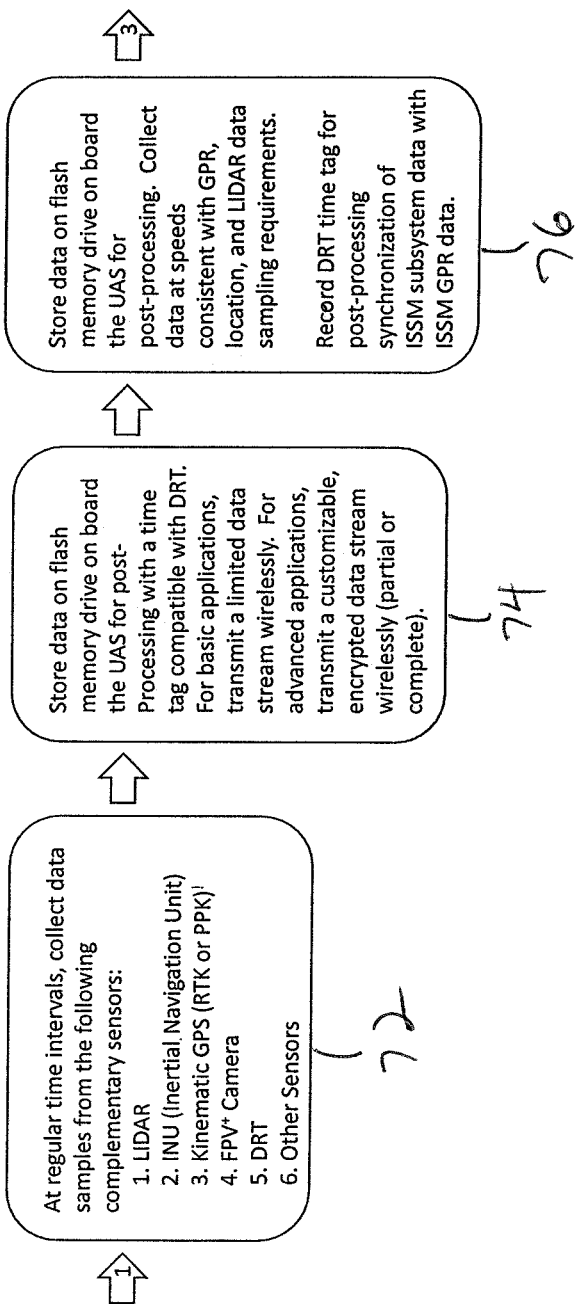
FIG. 14 shows a flow diagram of data collection for the primary integrated surface and subsurface metrology (ISSM) subsystems.

With reference to FIG. 14, explanation is given concerning data collection in a flow diagram. Thus, the box 72 explains, again, that at regular time intervals data is collected from the combined LIDAR, inertial navigation unit (INU) and GPS, all referred to by the reference numeral 1 in FIGS. 1-3, along with data from the VRT and any other involved sensors. Box 74 explains that all such data is stored onboard the UAV 20 in the form of a small memory card which can be one known as a SANDISK chip, a flash drive or any other small large-capacity memory device. Box 76 explains data is collected at speeds consistent with operation of the GPR and the LIDAR. Time lags are recorded for post-processing.

Figure 15:
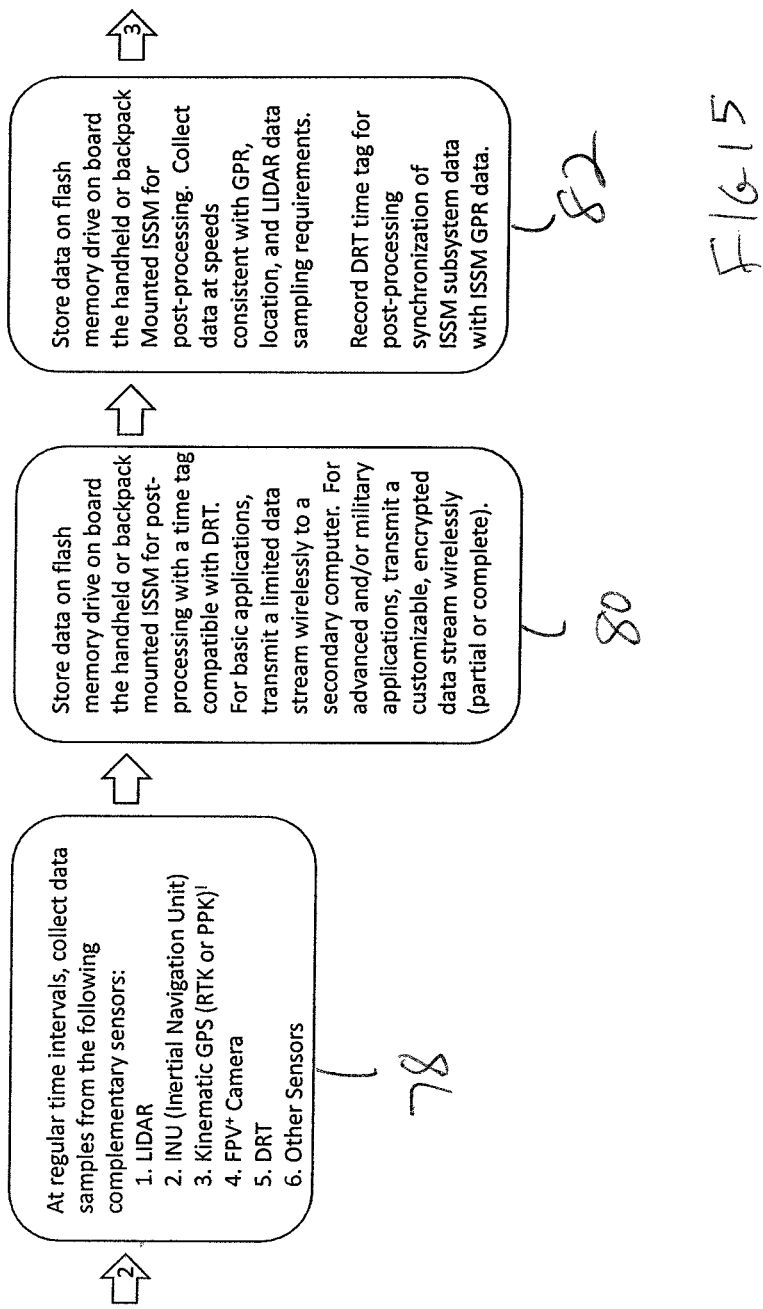
FIG. 15 shows a flow diagram of data collection for a handheld or backpack mounted primary ISSM subsystem.

With reference now to FIG. 15, data collection is explained where the platform is a backpack or the device is handheld by the user. Boxes 78, 80 and 82 correspond to boxes 72, 74 and 76 from FIG. 14, respectively.

Figure 16:
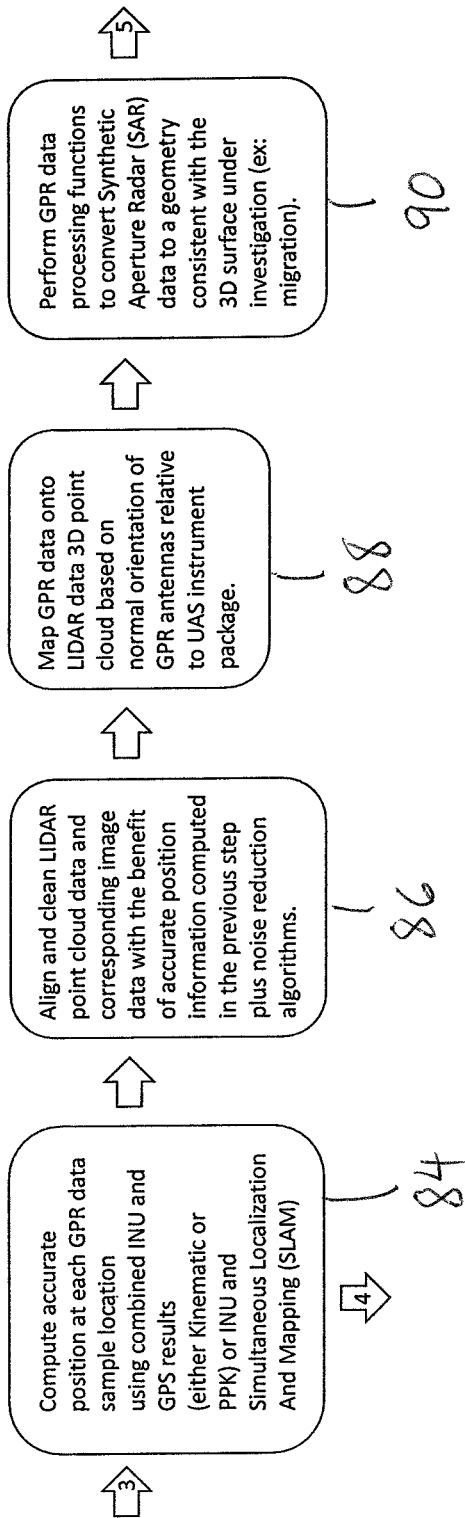
FIG. 16 shows a flow diagram for post-processing of primary ISSM software.

FIG. 16 shows a flow diagram for post-processing of the Primary ISSM software. The box 84 explains that accurate position of the device is computed at each GPR data sample location using combined INU and GPS results. In box 86, the LIDAR is aligned and cleaned with respect to point cloud data and corresponding image data so that accuracy can be attained. Box 88 explains that GPR data is mapped onto LIDAR data so that the specific location of measurements can be clearly substantiated. In box 90, it is explained that GPR data processing functions are performed to convert synthetic aperture radar (SAR) data to a geometry consistent with the 3-D surface underinvestigation.

Figure 17:
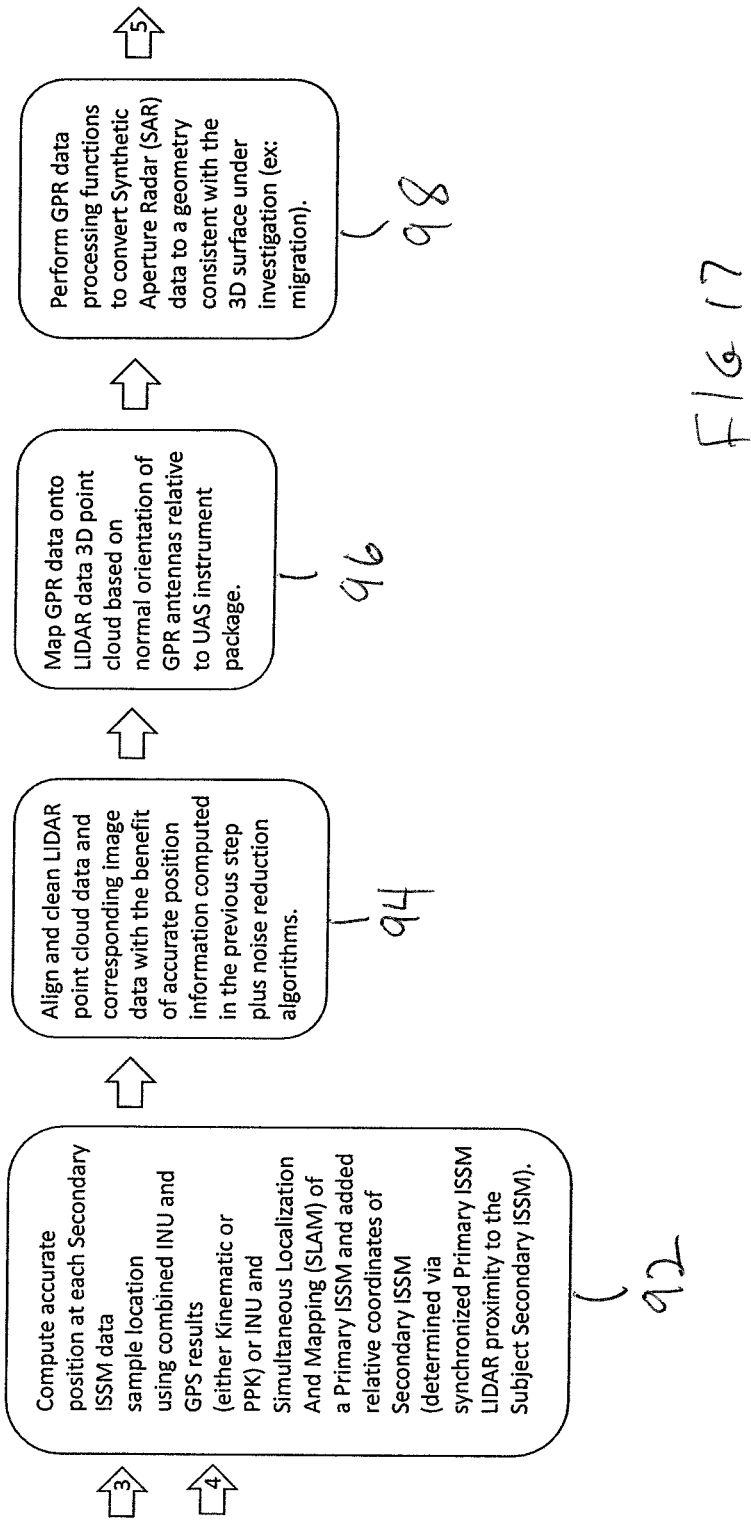
FIG. 17 shows a flow diagram for data collection for secondary ISSM software.

With reference to FIG. 17, a flow diagram is provided concerning data collection in the Secondary ISSM software. As explained in this flow diagram, in box 92, accurate position at each Secondary ISSM data sample location is computed using combined INU and GPS results. Box 94 explains how the LIDAR is aligned and cleaned to enhance accuracy of position measuring and indication. Box 96 explains that GPR data is mapped onto LIDAR data so that the location of each measurement on a 3-D area can be accurately obtained and retained. Box 98 explains that GPR data functions are performed to convert SAR data to a geometry consistent with the 3-D surface under investigation.

Figure 18:
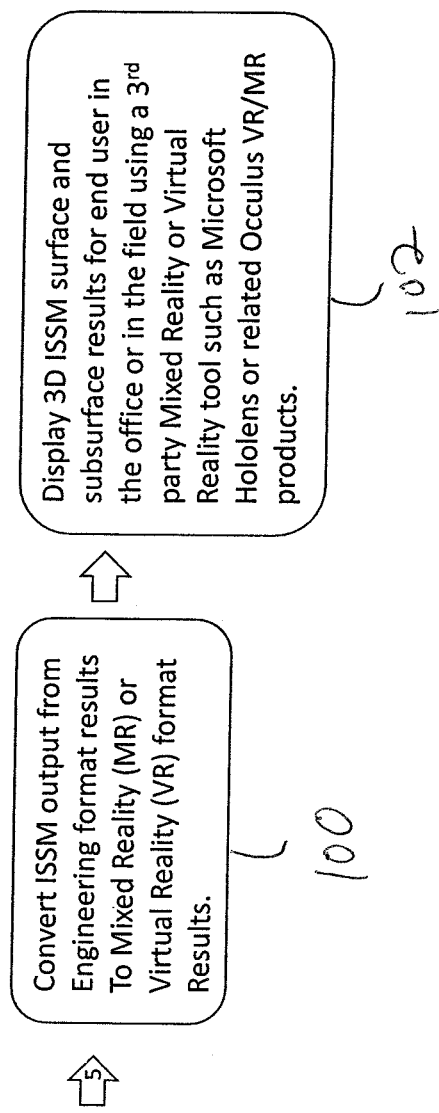
FIG. 18 shows a flow diagram for data collection for display of ISSM software.

FIG. 18 shows a flow diagram for data collection and display. In the flow diagram, ISSM output is converted from an engineering format to mixed reality or virtual reality format results. In box 102, the 3-D ISSM surface is displayed and subsurface results are also displayed.

ISSM positioning in typical outdoor environments is most economical when provided by an INU/GPS unit with a Post Processed Kinematic (PPK) solution or equivalent capabilities. On the other hand, positioning in urban canyons and indoor environments can require positioning with INU/SLAM or a very low drift rate INU/LIDAR positioning solution to localize ISSM measurement platform position and the relative position of features of interest.

Based upon the teachings of the present invention as explained in detail above, LIDAR and GPR are combined together on a movable platform to enable the user to accurately determine defects or objects in a 3-D space, either on a surface or beneath the surface or both with great accuracy. The LIDAR is used to accurately determine the specific location of the movable platform at any moment in time in a 3-D coordinate system. The GPR takes measurements many times every second and each measurement is coupled to a LIDAR location reading so that each measurement is coordinated with the specific location where it was taken in 3-D space including beneath the ground.

Correlation of surface and subsurface features is critical to evaluating and using metrology information for engineering applications, many infrastructure evaluation applications, and even military applications (such as land mine detection). ISSM will make such information economical to obtain. ISSM streamlines efficient collection and evaluation of relevant surface condition changes such as disturbed soil (often correlated with detection and/or verification of subsurface land mine locations) and buried land mines.

Through use of the present invention, three key applications are contemplated. First, the present invention when used in association with a UAV can be flown to remote or difficult to reach locations under usual circumstances. Examples include large highly elevated bridges, highway bridges, dams, skyscrapers, large reinforcing walls, and others. A UAV mounted ISSM system can be flown to those locations, use LIDAR to accurately keep track of the specific location of the UAV at any moment in time, and use GPR to take measurements on surfaces and beneath the surfaces of such structures with the GPR able to detect imperfections on the surface and beneath the surface so that images can be constructed and displayed for owners of such structures so that they can determine whether there is a need to repair or replace various structures or subcomponents thereof.

In a second application, the present invention can be used on a flying platform to detect buried mines, whether plastic or metal, as well as IEDs (improvised explosive devices) that have become more and more common the battlefield. A vehicle can be equipped with the present invention on the UAV platform which can fly ahead of the vehicle to detect underground mines and IEDs so that they can either be dodged or removed or harmlessly exploded.

In a third application, efficient and precise data collection can be achieved from the air versus the ground for many more conventional use cases, including surface and subsurface evaluation of standardized bridges, rapid bridge construction bridges, smaller buildings, utility infrastructure right of way clearances, and much more. For many applications, UAS automation and access from the air is frequently more efficient than terrestrial measurements or other manual measurement techniques.

The American military has discovered that when a terrorist enemy is driven from a city or other location, they typically leave behind booby traps of IEDs, mines, and other damaging explosives with the intent of killing or maiming military personnel who might enter the jurisdiction after they have been driven out of it. Through use of the present invention, whether in association with a vehicle or by a person on foot holding a system in their hand or keeping it in a backpack, the system can be used to detect explosive devices within buildings as well as buried in roadways, in fields, and in other locations.

The description set forth above in connection with the appended drawing figures explains not only the details of the apparatus but, through flowcharts, explains the manner and method by which the system is operated to achieve the desired results.

As such, an invention has been disclosed in terms of preferred embodiments thereof which fulfill each and every one of the objects of the invention as set forth hereinabove, and provide a new and useful apparatus and method for determining defects in dielectric materials and detecting subsurface objects of great novelty and utility.

Of course, various changes, modifications, and alterations in the teachings of the present invention may be contemplated by those of ordinary skill in the art without departing from the intended spirit and scope thereof.

As such, it is intended that the present invention only be limited by the terms of the appended claims.

The invention claimed is:
1. An apparatus for examining a three-dimensional space and recording data in an adjacent said space, comprising:
 a) a rigid frame to which are fixedly mounted:
  i) a light detection and ranging (LIDAR) device capable of determining location of said frame within said space at any given time and generating a first set of data; and
  ii) a ground penetration radar (GPR) device capable of measuring characteristics of said space and an area adjacent said space including any one or more of an open area, an area within a solid object or beneath a ground surface and generating a second set of data;
 b) said apparatus including a computer programmed to receive said first and second sets of data and connected to a storage device storing said data;
 c) said computer being programmed to correlate data points from said first set of data as to location of said frame at every given time with data points from said second set of data as to measurements taken by said GPR within and adjacent said space; and
 d) a display connected to said computer and displaying a map of said space and adjacent said space as well as data generated by said GPR;

e) said rigid frame being mounted on an unmanned aerial vehicle (UAV) by a gimbal.

2. The apparatus of claim 1, wherein said storage device is incorporated into said computer.

3. The apparatus of claim 1, wherein said computer is mounted on said frame.

4. The apparatus of claim 1, wherein said first and second sets of data are transmitted to said computer wirelessly.

5. The apparatus of claim 4, wherein said computer is located remotely from said frame.

6. The apparatus of claim 1, further including an optical camera fixedly mounted on said frame and connected to a further display viewable by a user and permitting said user to monitor movements of said frame.

7. The apparatus of claim 6, wherein said further display is located remotely from said frame and receives signals from said optical camera wirelessly.

8. The apparatus of claim 1, wherein said UAV includes a plurality of propellers.

9. The apparatus of claim 1, wherein said UAV carries said computer.

10. The apparatus of claim 9, wherein said storage device is removable from said frame.

11. The apparatus of claim 9, further including a dynamic retroreflective target mounted on said frame which receives reflected signals from said LIDAR and displays a dynamic graphical code indicating time data to synchronize said first and second sets of data.

12. The apparatus of claim 9, wherein a GPS subcircuit is mounted on said frame and connected to said computer, said GPS subcircuit being calibratable to cause said computer to be aware of location of said UAV as it moves.

13. The apparatus of claim 1, further including a Simultaneous Localization and Mapping (SLAM) device or a dynamic retroreflective target mounted on said frame which receives reflected signals from said LIDAR and displays a dynamic graphical code indicating time data to synchronize said first and second sets of data.

14. A method of examining a three-dimensional space and recording data in and adjacent said space including the steps of:

a) providing a rigid frame to which are fixedly mounted:
  i) a light detection and ranging (LIDAR) device; and
  ii) a ground penetration radar (GPR) device;
b) providing a computer and a display;
c) programming said computer to receive a first set of data from said LIDAR device and a second set of data from said GPR device;
d) connecting said computer to a storage device, said computer conveying said first and second sets of data to said storage device for storage;
e) programming said computer to correlate data points from said first set of data as to location of said frame at every given time with data points from said second set of data as to measurements taken by said GPR within and adjacent said space;
f) providing a display connected to said computer, said display displaying a map of said space and adjacent said space as well as data generated by said GPR;
g) said space adjacent said three-dimensional space including any one of an open space, a solid object or an underground area; and
h) further including the steps of mounting said rigid frame on an unmanned aerial vehicle (UAV) via a gimbal, flying said UAV within said three-dimensional space and collecting said first and second sets of data.

15. The method of claim 14, further including the step of mounting said computer on said rigid frame.

16. The method of claim 15, further including the step of mounting a dynamic retroreflective target on said frame, receiving reflected signals from said LIDAR in said target and displaying on said display dynamic graphical code indicating time data to synchronize said first and second sets of data.

17. The method of claim 14, wherein said UAV has a plurality of propellers.

18. The method of claim 14, wherein said UAV has an optical camera mounted thereon and connected to a further display viewable by a user and permitting said user to monitor movements of said frame within said three-dimensional space.

* * * * *